United States Patent [19]

Williams, Jr.

[11] Patent Number: 5,009,445
[45] Date of Patent: Apr. 23, 1991

[54] TRAILER HITCH CABLE PULLER

[76] Inventor: Thomas M. Williams, Jr., 2310 Old Oxford Hwy., Durham, N.C. 27704

[21] Appl. No.: 416,720

[22] Filed: Oct. 3, 1989

[51] Int. Cl.⁵ .............................................. B60D 1/38
[52] U.S. Cl. .................................... 280/477; 280/480; 254/420
[58] Field of Search ..................... 280/477, 478.1, 480; 74/424.8 A; 254/420

[56] References Cited

U.S. PATENT DOCUMENTS

| | | | |
|---|---|---|---|
| 1,724,616 | 8/1929 | Rapellin | 74/424.8 A |
| 3,201,144 | 8/1965 | Smyser | 280/477 |
| 3,596,925 | 8/1971 | Richie | 280/477 |
| 3,718,317 | 2/1973 | Hilmer | 280/480 |
| 3,738,613 | 6/1973 | Hollis, Jr. | 254/420 |
| 3,767,230 | 10/1973 | DeVries | 280/477 |
| 4,042,254 | 8/1977 | Allen | 280/478 |
| 4,186,939 | 2/1980 | Woods et al. | 280/477 |

FOREIGN PATENT DOCUMENTS 2210837  6/1989  United Kingdom ................ 280/477

Primary Examiner—Richard A. Bertsch
Assistant Examiner—Mitchell Bompey
Attorney, Agent, or Firm—Olive & Olive

[57] ABSTRACT

The invention apparatus provides a winching mechanism which is detachably secured to the forward end of the tongue of a trailer. In a first embodiment, a slip nut on a crank operated vertical threaded drive shaft is attached to one end of a cable the opposite end of which is fitted with a snap hook which can be secured to a ball mount. The cable passes around a pulley at the base of a tubular housing in which the threaded shaft and slip nut are mounted. The pulley is located below the tongue. The cable is provided with a hook which is connected to a ball mount and when the drive shaft is driven by the crank causes the front of the trailer to be lifted and drawn to the towing vehicle for connection of the ball socket to the ball on the ball mount. In a second embodiment, the cable is wound on a crank operated drum and is fed to a pulley located below the tongue in a tubular housing of shorter length than employed in the first embodiment.

3 Claims, 6 Drawing Sheets

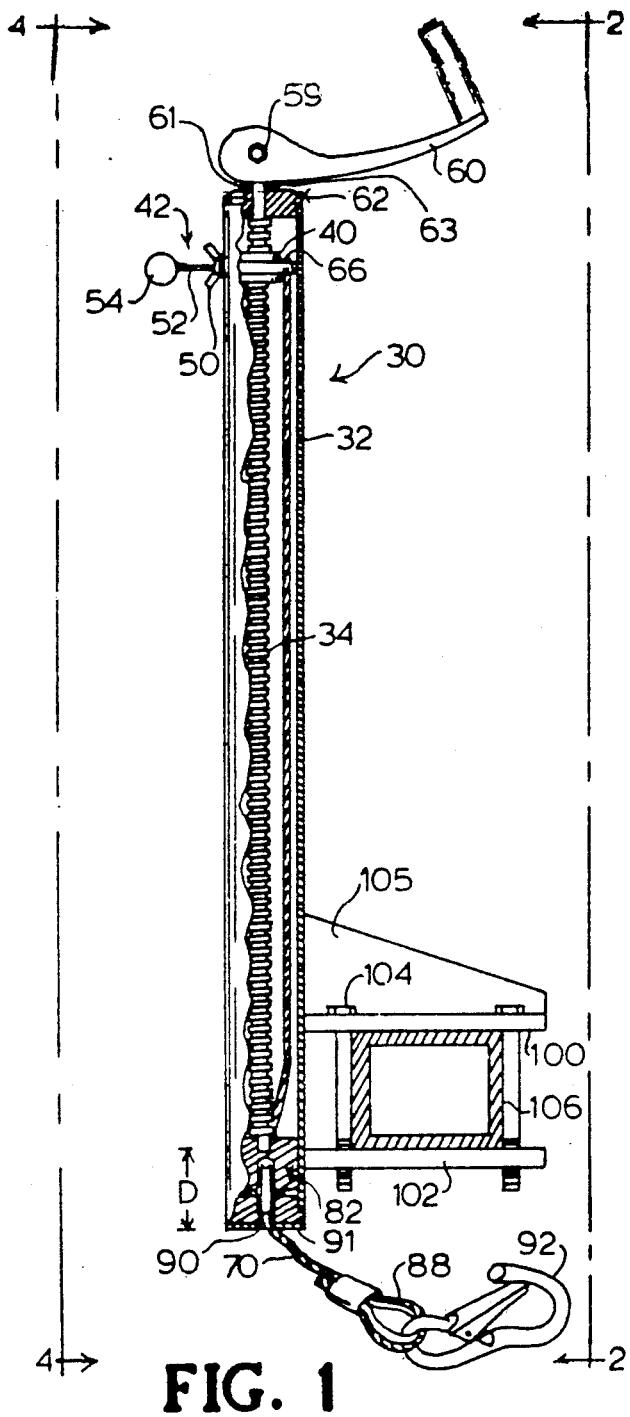
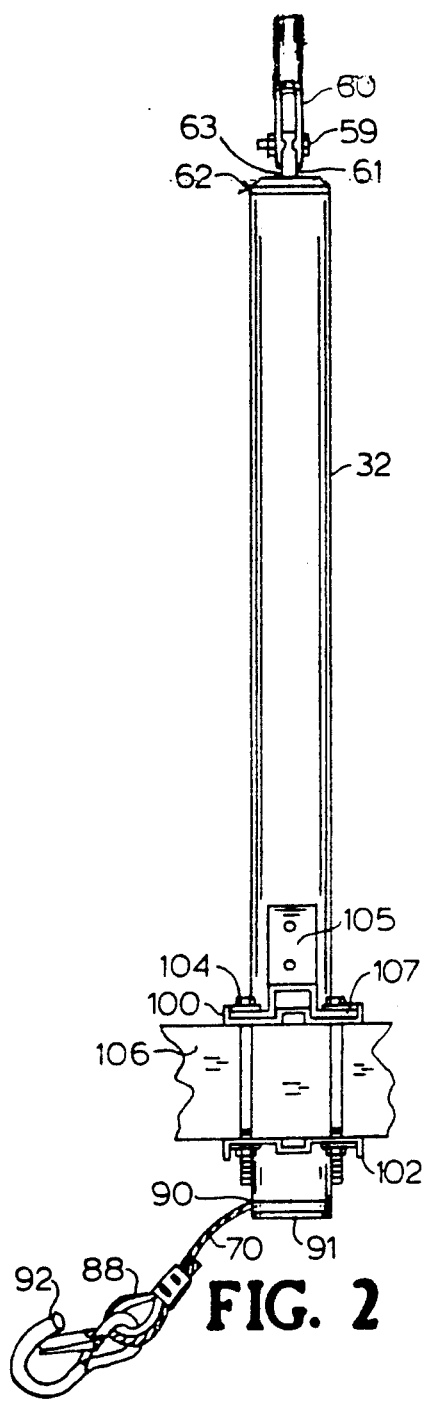
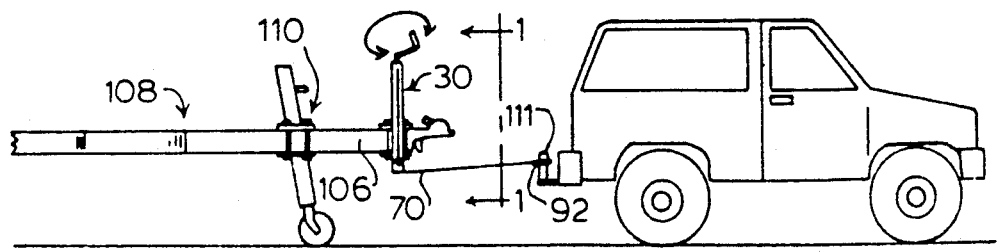
FIG. 1
FIG. 2
FIG. 3

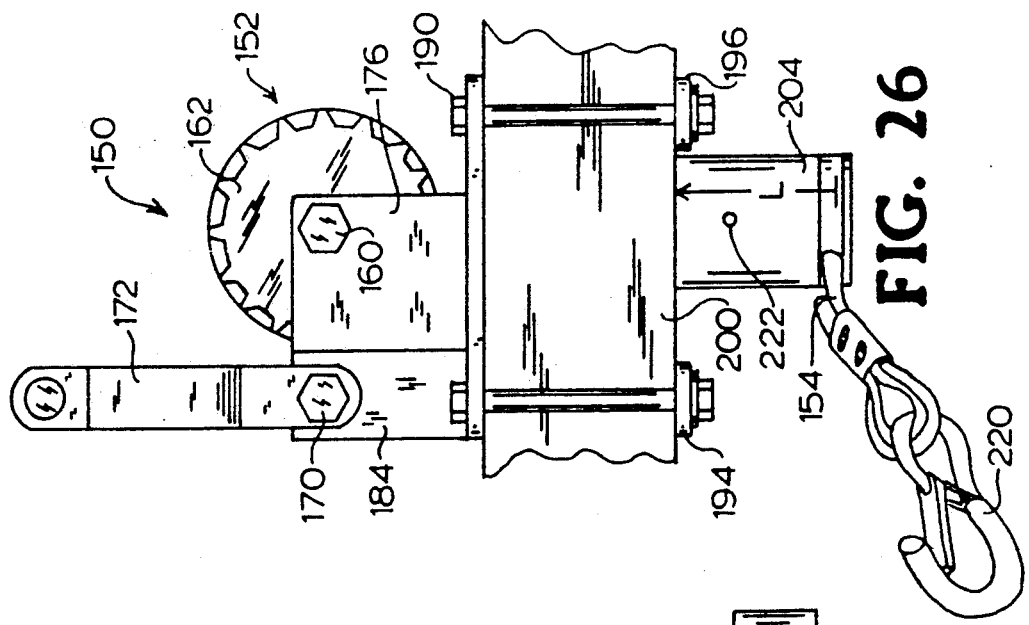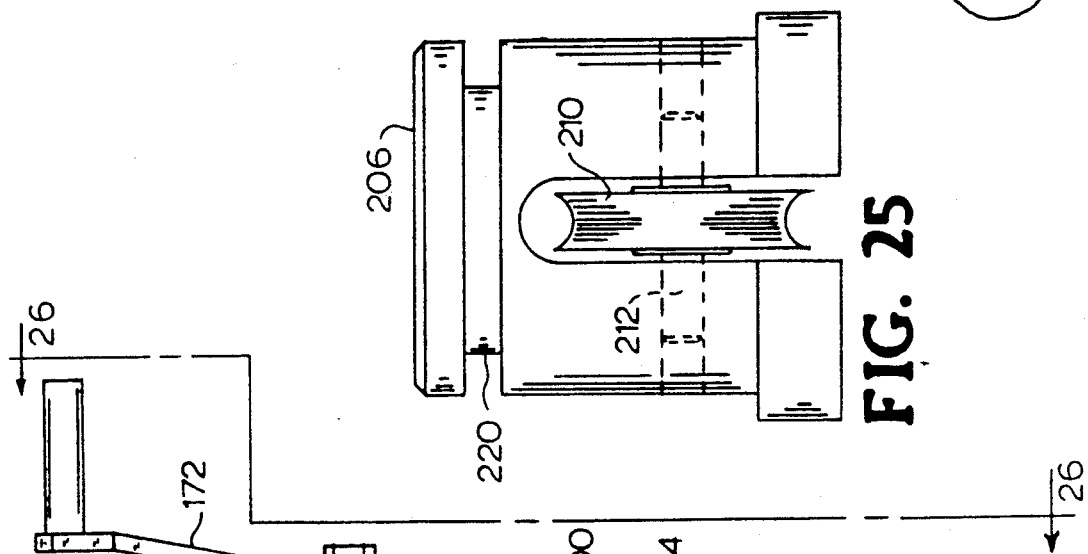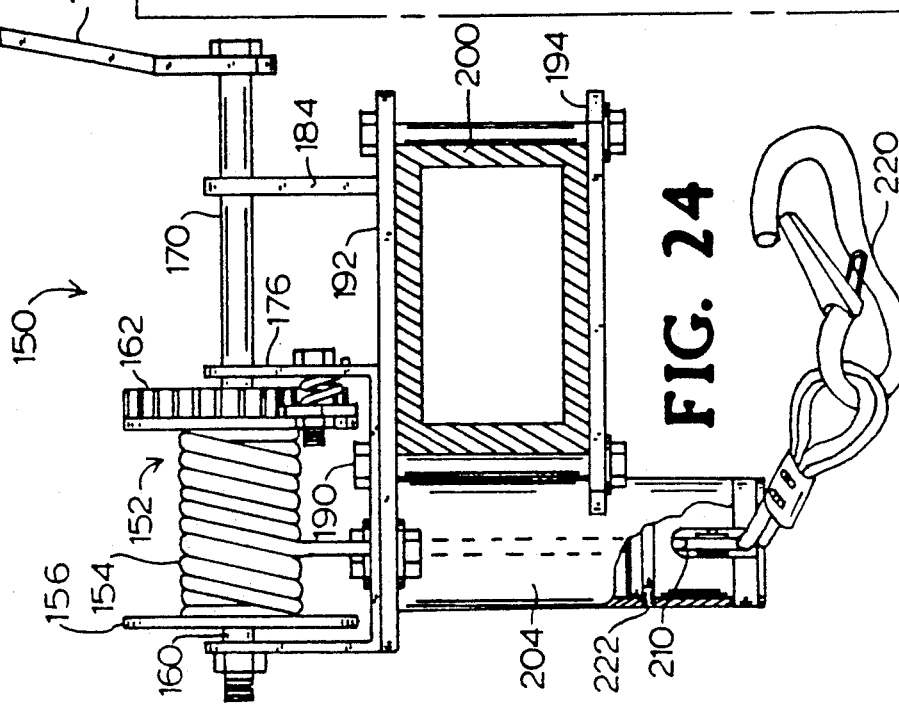

TRAILER HITCH CABLE PULLER

BACKGROUND OF INVENTION

1. Field of the Invention

This invention relates generally to winching devices and more specifically to a winching device for pulling the tongue of a towed trailer with its ball socket towards the ball mount on the towing vehicle until the two hitch components can be aligned and interconnected.

2. Background Art

In the practice of hitching a trailer and its ball socket to the towing vehicle and its ball mount, it is sometimes extremely difficult to move the trailer to its final hitching position so that the ball socket and ball mount can be aligned and interconnected. Often the trailer ball socket can be easily brought to within about one to two feet of the towing vehicle ball mount. However, because of soft ground, the angle of the trailer to the towing vehicle, the weight on the tongue or other reasons, it is often difficult to manually move the trailer the required last one to two feet.

While it is known to mount a permanent winch on the rear of a towing vehicle and its also known to mount a winch at an elevated position on a post at the front of a boat trailer for pulling a boat out of the water onto the boat trailer, neither of these types of winches are adapted to be clamped to the tongue of the trailer as with the present invention and to provide a pulling force which extends from a pulley mounted at least several inches below the trailer tongue and at an upward angle to the ball mount.

U.S. Pat. No. 4,042,254 describes a pair of matable cone shaped members which are drawn together by a screw mechanism and a chain or cable. While the device of this patent seeks to deal with the problem of aligning and bringing the trailer and towing vehicle hitch components together the device does not permit use of the conventional ball socket and ball mount type of interconnection.

Thus, the present invention seeks to provide an improved winching device which can be detachably secured to the tongue of a trailer for pulling a conventional ball mount and ball socket together for interconnection and without requiring modification of either hitch component or modification of the trailer. Other objects will become apparent as the description proceeds.

SUMMARY OF INVENTION

The invention apparatus provides a winching mechanism which is detachably clamped to the forward end of the tongue of a trailer. In a first embodiment, a slip nut on a crank operated, vertically positioned threaded drive shaft is attached to one end of a cable the opposite end of which is fitted with a snap hook which can be secured to a ball mount. The cable passes around a pulley at the base of a tubular housing in which the threaded shaft and slip nut are mounted. The pulley is located at least several inches below the tongue. A slot in the tubular housing permits a handle attached to the slip nut to travel with the slip nut. In use, when the ball socket and ball mount are relatively close together but are difficult to draw together, the cable hook is drawn out and secured to the ball mount and the handle is employed to position the slip nut to its extreme position of travel. The slip nut is then repositioned for engagement with the threaded drive shaft which is then rotated by the crank so as to pull the trailer ball socket to the ball mount for engagement of the ball and ball socket. The pulling force is transmitted through the length of cable and extends at an upward angle between the pulley and the ball mount and provides a lifting force to the front of the trailer where the winching mechanism of the invention is mounted.

In a second embodiment, the winching mechanism incorporates a drum on which the cable is wound and which is rotated by a crank. The winch drum and crank are mounted on a base plate which is detachably clamped to the forward end of the tongue of the trailer. The upper end of a hollow tube is secured beneath the base plate and the cable is passed through an opening in the base plate through the hollow tube to a pulley mounted at the base of the tube. The pulling end of the cable is fitted with a cable hook as in the first embodiment. In use, when the ball socket and ball mount are relatively close together, the cable hook is drawn out from the cable drum and secured to the ball mount after which the crank is employed to wind up the cable on the drum and thereby bring the ball socket into registration with the ball mount.

DESCRIPTION OF DRAWINGS

FIG. 1 is a front partially broken away elevation view of the trailer hitch cable puller device of the invention taken in the direction of line 1—1 of FIG. 3 according to the first embodiment.

FIG. 2 is a side view of the device taken in the direction of line 2—2 of FIG. 1.

FIG. 3 is an elevation view of the front portion of a typically jack supported trailer being winched towards a towing vehicle utilizing the device of the invention according to the first embodiment.

FIG. 24 is a front partially broken-away elevation view of the trailer hitch cable puller device of the invention taken in the direction of line 24—24 of FIG. 23 according to the second embodiment.

FIG. 25 is an enlarged side view of the pulley block partially seen in FIG. 24.

FIG. 26 is a side view of the device according to the second embodiment taken in the direction of line 26—26 of FIG. 24.

DESCRIPTION OF PREFERRED EMBODIMENT

Figure 4:
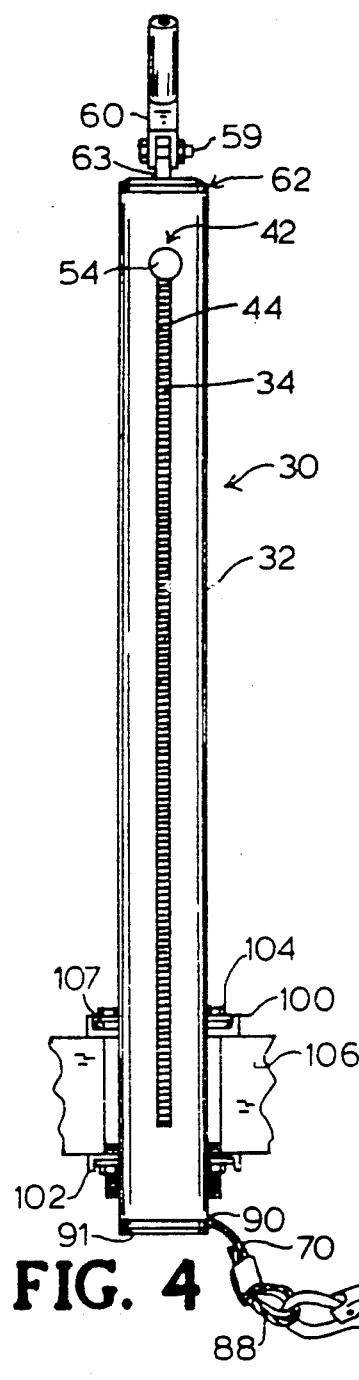
FIG. 4 is an elevation view taken in the direction of line 4—4 of FIG. 1.
Figure 5:
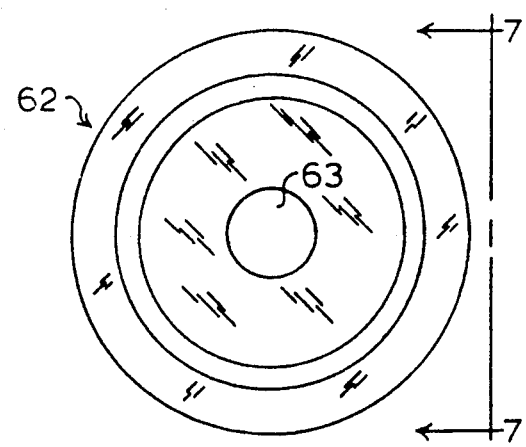
FIG. 5 is a plan view of a bearing block employed in the first embodiment and which mounts in the top of the housing and through which the upper end of the threaded shaft passes.
Figure 6:
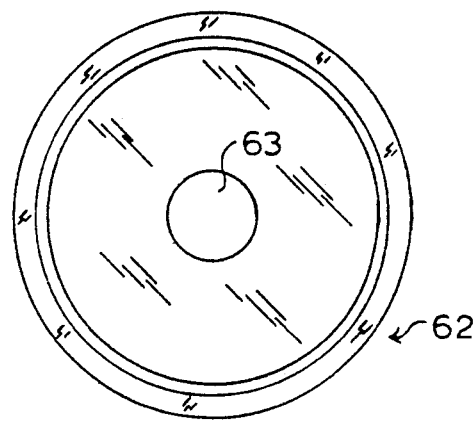
FIG. 6 is a bottom view of the bearing block shown in FIG. 5.
Figure 7:
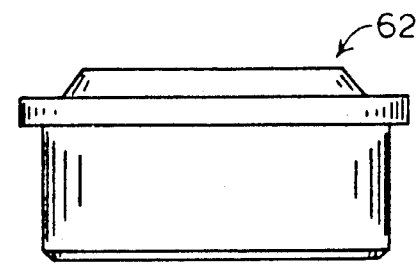
FIG. 7 is a side view of the bearing block shown in FIG. 5 taken in the direction of line 7—7 of FIG. 5.
Figure 8:
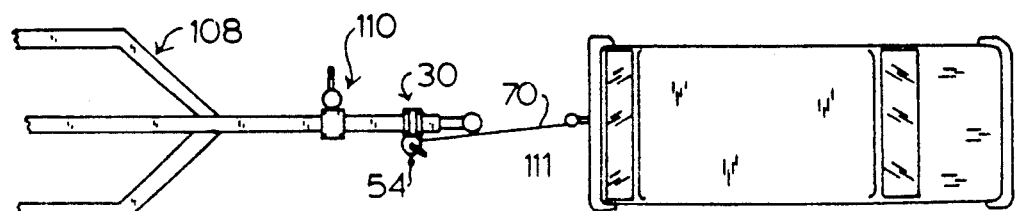
FIG. 8 is a top view of the winching operation depicted in FIG. 3 utilizing the device of the first embodiment.
Figure 9:
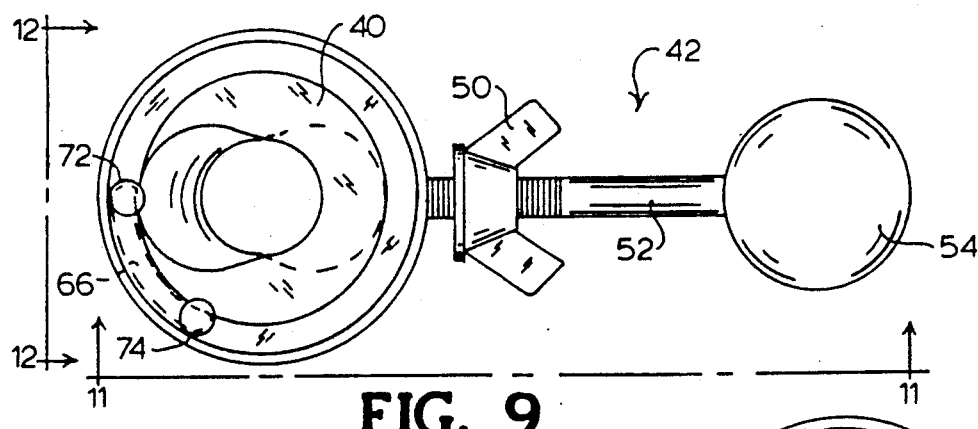
FIG. 9 is a top view of the slip nut-handle assembly taken in the direction of line 9—9 of FIG. 11.
Figure 10:
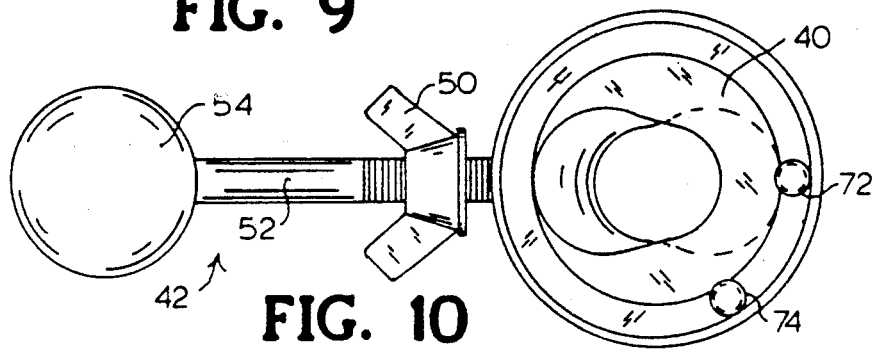
FIG. 10 is a bottom view of the slip nut-handle assembly taken in the direction of line 10—10 of FIG. 11.
Figure 11:
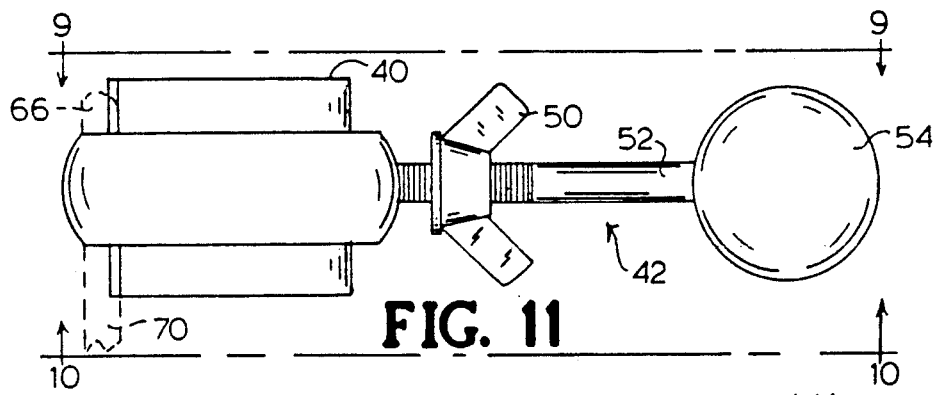
FIG. 11 is a side elevation view of the slip nut-handle assembly taken in the direction of line 11—11 of FIG. 9.
Figures 12, 13, 14:
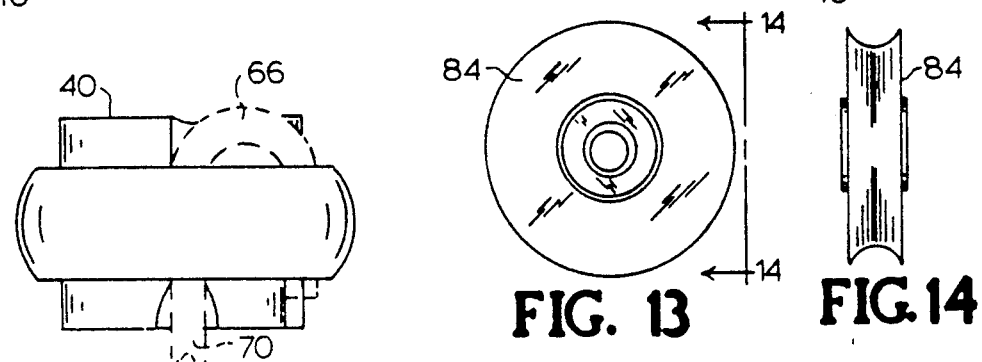
FIG. 12 is a side elevation view of the slip nut taken in the direction of line 12—12 of FIG. 9.
FIG. 13 is an elevation view of the pulley which mounts in the bottom of the housing and about which the cable is passed according to the first embodiment.
FIG. 14 is a side view of the pulley shown in FIG. 13 taken in the direction of line 14—14 of FIG. 13.
Figure 15:
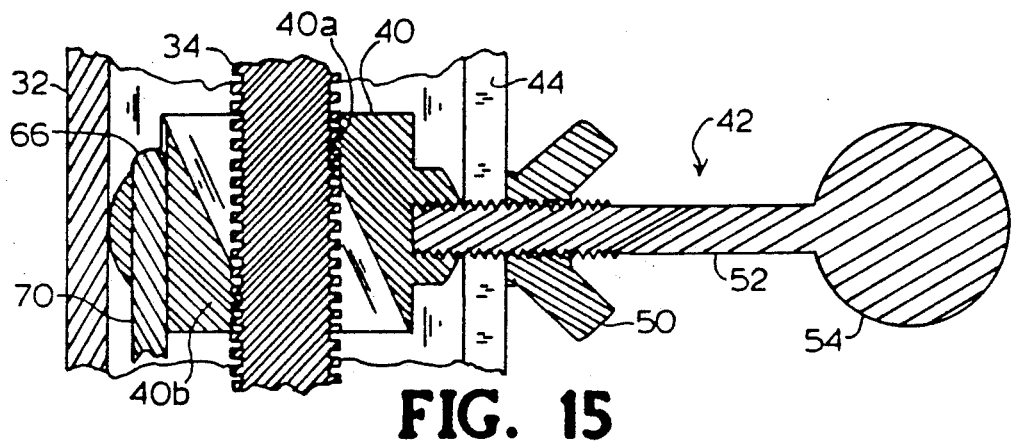
FIG. 15 is a broken-away sectional side view of the device of the first embodiment illustrating the slip nut engaged on the drive shaft and with the wing nut on the handle shaft positioned to maintain such engagement.
Figure 16:
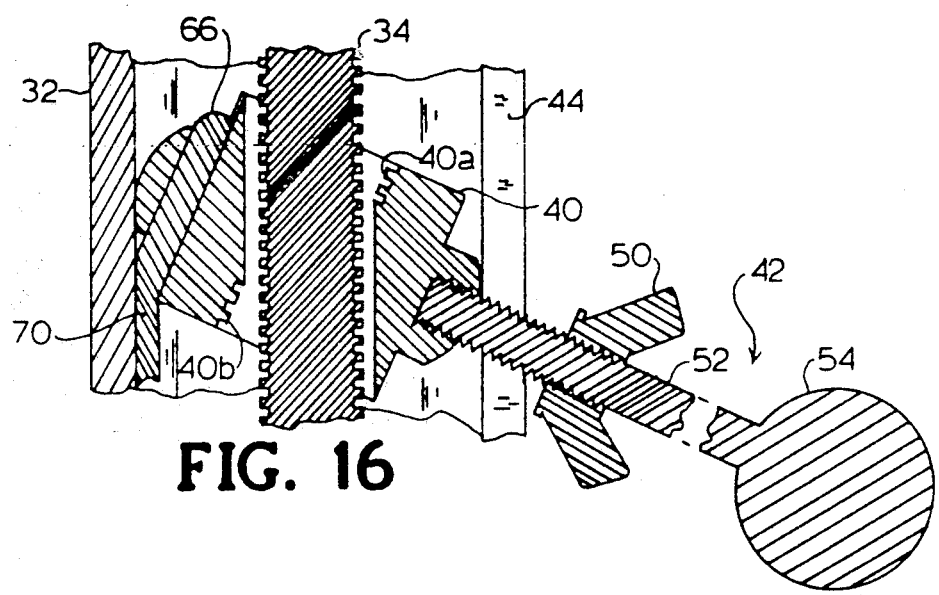
FIG. 16 is a broken-away sectional side view illustrating the slip nut disengaged from the drive shaft of the first embodiment and with the wing nut on the handle shaft positioned to permit such disengagement.
Figure 17:
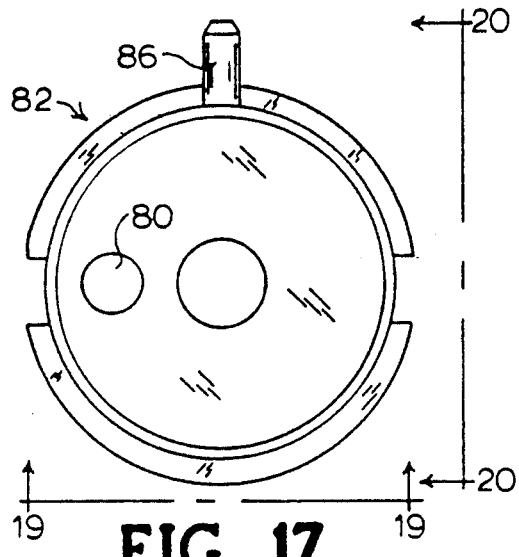
FIG. 17 is a top view of the pulley block which mounts in the base of the housing and in which the pulley is mounted according to the first embodiment.
Figure 18:
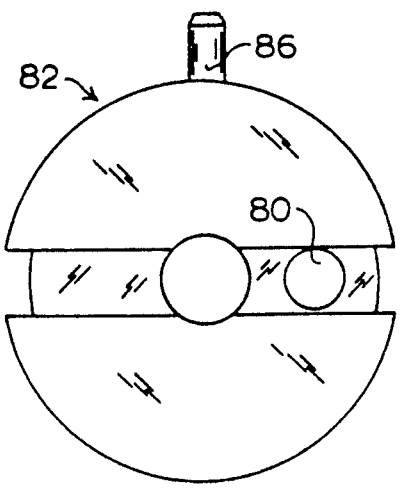
FIG. 18 is a bottom view of the pulley block shown in FIG. 17.
Figure 19:
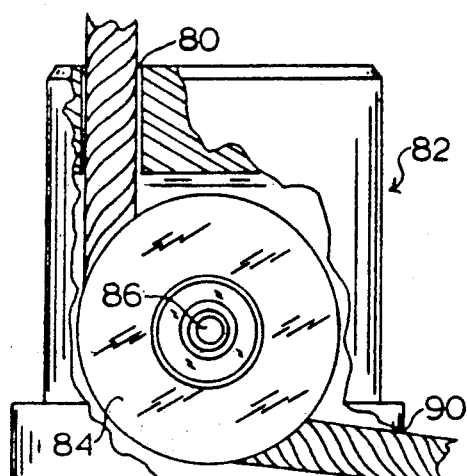
FIG. 19 is a side view of the pulley block taken in the direction of line 19—19 of FIG. 17 with a portion of the pulley block broken away.
Figure 20:
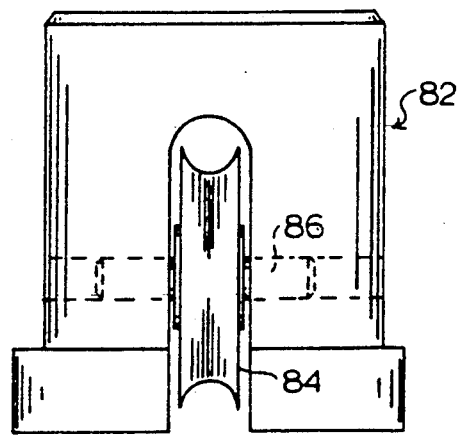
FIG. 20 is a side view of the pulley block taken in the direction of line 20—20 of FIG. 17.
Figure 21:
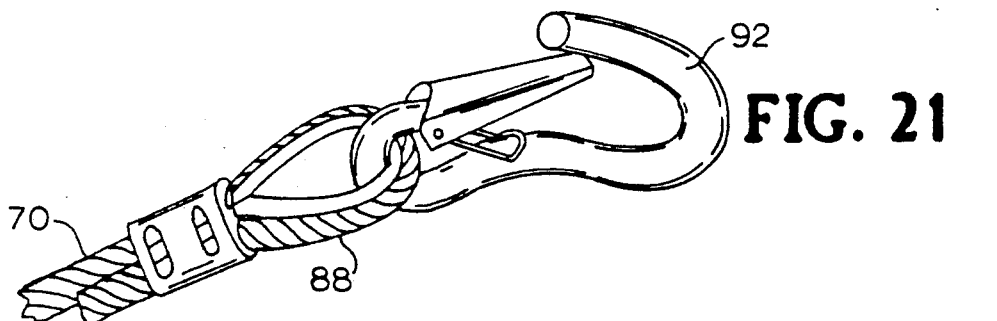
FIG. 21 is a perspective view of the snap hook attached to the cable of the first embodiment and a portion of the end of the cable to which the snap hook is attached.

Making reference to the drawings, the trailer hitch cable puller 30 of the invention according to a first embodiment illustrated in FIGS. 1-21 comprises a tubular metal housing 32 in which is mounted a threaded drive shaft 34 having a slip nut 40. Slip nut 40 is engaged and disengaged by means of an operator handle 42 assembly secured to slip nut 40 and designed to travel in slot 44 extending for the length of housing 32. A wing nut 50 on threaded portion 52 of handle 42 enables handle 42 to be locked into position utilizing handle knob 54.

Crank 60 pivots on pin 59 and is secured to the upper end 61 of drive shaft 34 and extends through hole 63 in the shaft mounting block 62. Block 62 closes the upper end of housing 32 and is welded in place. It will be understood that when slip nut 40 is engaged as in FIG. 15, turning of crank 60 will cause slip nut 40 to travel up or down on drive shaft 34 dependent on the direction of turning crank 60. Threaded positions 40a, 40b (FIG. 15) permit such engagement. An upper turned down end 66 (FIG. 12) of cable 70 is secured in holes 72, 74 of slip nut 40 and is fed through the interior of housing 32 to a vertical passage 80 in pulley block 82. Block 82 closes the lower end and is welded in place to housing 32. Welded on cover plate 91 covers the bottom of block 82. Block 82 supports rotatable pulley 84 on shaft pin 86 about which cable 70 is passed to an exit 90 formed at the base of housing 32 and located a distance D (FIG. 1) at least several inches below the frame 106. The opposite end 88 of cable 70 is fitted with a snap hook 92 (FIG. 21) for engaging a ball mount 111 as in FIGS. 3 and 8.

A pair of clamp plates 100, 102 below brace 105 are secured by bolts 104 passing through flanges 107 enabling cable puller 30 of the invention to be detachably secured to a trailer frame channel 106 as in FIGS. 1-4. Cable 30 is thus able to travel with trailer 108 alongside the conventional trailer jack 110 and to be used or easily removed when desired.

As previously stated, the device 30 of the invention is used when the ball socket and ball mount are relatively close together but are difficult to draw together. At this stage with the slip nut 40 disengaged, the cable hook 92 is drawn out and secured to the ball mount 111 as in FIG. 3 and the handle 42 is employed to position the slip nut 40 to its lowest position of travel or to such position as is necessary for the length of cable to be pulled out. The slip nut 40 is then repositioned for engagement with the threaded shaft as in FIG. 15. Crank 60 is then rotated so as to elevate slip nut 40 and pull the trailer ball socket to the ball mount through cable 70 for engagement of the ball and ball socket.

Figure 22:
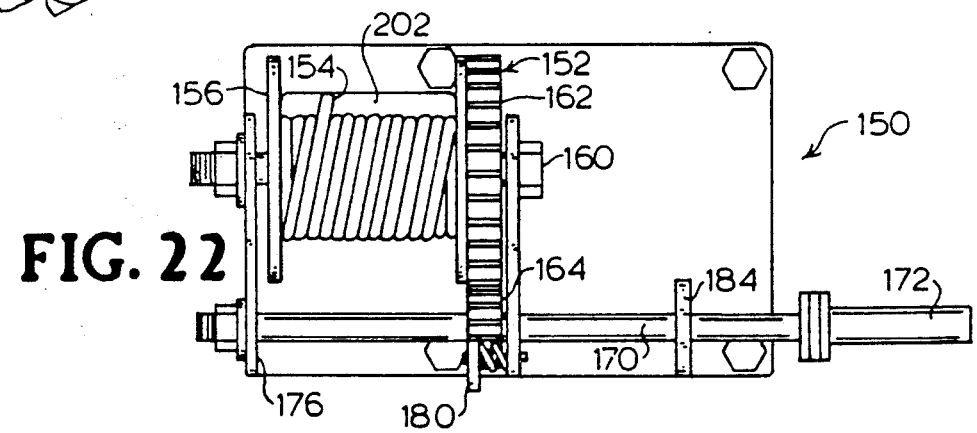
FIG. 22 is a top plan view of a winching mechanism according to a second embodiment of the invention.
Figure 23:
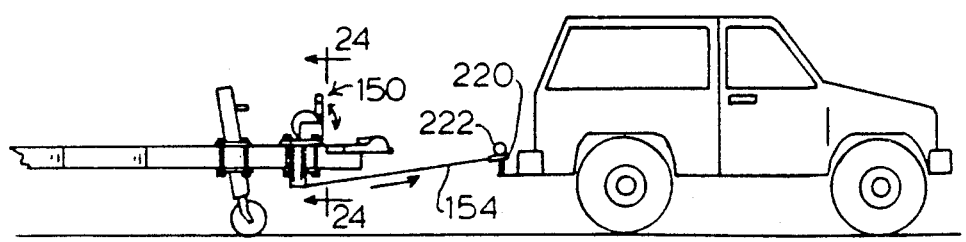
FIG. 23 is an elevation view of the front portion of a typically jack supported trailer being winched toward a towing vehicle utilizing the device of the invention according to the second embodiment.

A second embodiment is illustrated in reference to FIGS. 22-26 in which the invention mechanism 150 comprises a winch 152 having a cable 154 on a drum 156 which rotates on shaft 160 and mounts gear 162 by which it is driven. Gear 162 meshes with a smaller drive gear 164 on shaft 170 driven by crank 172. Shafts 160 and 170 are mounted in a U-shaped support bracket 176 and gear 164 releasably engages pawl 180. Another upright bracket 184 provides a bearing support for shaft 170. Bolts 190 pass through a winch base plate 192 and through clamp bars 194, 196 enabling the entire winch assembly 150 to be clamped to tongue frame member 200 as illustrated. Cable 154 is fed through an opening 202 in base plate 192 and downward through hollow tube 204 to a lower pulley block 206 in which pulley 210 mounts on pin 212. A groove 220 loosely receives support pins 222 which enables pulley block 206 to swivel relative to tube 204.

As will be best seen in FIGS. 24-26, pulley 210 is located so that cable 154 feeds out from pulley 210 at a distance L (FIG. 26) at least several inches below tongue frame 200. The run of cable between pulley 210 thus extends upwardly as in FIG. 23 and tends to raise the front of the trailer in use when hook 220 is mounted on ball mount 222 as previously explained.

In summary, several features are to be noted and which apply to both embodiments:
(a) The device of the invention can be readily attached to or removed from the trailer frame.
(b) The pulley is positioned so as to reside at least several inches below the tongue.
(c) When in use the pulling force applied through the run of cable extending between the pulley and the ball mount is angled upwardly which provides a lifting force to the front of the tongue.

I claim:

1. A clamp-on trailer alignment device mountable on a tongue of a trailer having a ball socket, the tongue being formed of a hollow channel of rectangular cross section, comprising:
   (a) a winding cable having an outer end fitted with means for engaging a ball mount on a towing vehicle;
   (b) a winching mechanism comprising:
      (i) a base plate secured to a top surface of the trailer tongue by fasteners positioned on opposite sides of the tongue and secured to a clamp plate on a bottom surface of the tongue and including a side portion extending outwardly from one side of said tongue and having an aperture;

(ii) a drum assembly including a cable drum fixedly mounted on one driven end of a shaft and supported on and positioned above said base plate side portion, said shaft being rotatably supported on and above said base plate and having an opposite drive end extending outwardly from an opposite side of said tongue with a handle mounted on said opposite shaft drive end;

(c) a pulley assembly including a vertical tubular housing secured at an upper end to a bottom surface of said base plate side portion below said aperture and extending downwardly from said base plate to a lower end and a cable pulley mounted in said lower end of said tubular housing; and (d) said cable extending from said drum through said aperture downwardly through a cavity formed by said tubular housing, over said pulley and from the pulley to the ball mount enabling a run of cable between said pulley and the ball mount to extend at an upward angle to thereby give a lifting effect to the front of said tongue.

2. A trailer alignment device as claimed in claim 1 wherein said vertical tubular housing includes a pulley block located within said housing and said pulley is mounted in said block.

3. A trailer alignment device as claimed in claim 2 wherein said pulley block is mounted in said tubular housing in a manner enabling said pulley block to swivel around the vertical axis of said tubular housing.

* * * * *